(12) United States Patent
Ertas et al.

(10) Patent No.: US 9,416,820 B2
(45) Date of Patent: Aug. 16, 2016

(54) BEARING HAVING INTEGRALLY FORMED COMPONENTS

(71) Applicant: GENERAL ELECTRIC COMPANY, Schenectady, NY (US)

(72) Inventors: Bugra Han Ertas, Slingerlands, NY (US); Adolfo Delgado Marquez, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 75 days.

(21) Appl. No.: 14/566,798

(22) Filed: Dec. 11, 2014

(65) Prior Publication Data
US 2016/0169281 A1      Jun. 16, 2016

(51) Int. Cl.
*F16C 17/03* (2006.01)
*F16C 32/06* (2006.01)

(52) U.S. Cl.
CPC ......... *F16C 32/0662* (2013.01); *F16C 32/0614* (2013.01)

(58) Field of Classification Search
CPC ........ F16C 17/03; F16C 17/035; F16C 27/02; F16C 32/0677
USPC ............................. 384/99, 117, 119, 309, 312
See application file for complete search history.

(56) References Cited

U.S. PATENT DOCUMENTS

| | | | | |
|---|---|---|---|---|
| 3,110,526 A | * | 11/1963 | Sternlicht | F16C 27/02 384/222 |
| 4,743,125 A | * | 5/1988 | Dammel | F16C 27/02 384/117 |
| 4,793,722 A | * | 12/1988 | Jensen | F01D 25/164 384/222 |
| 4,872,767 A | * | 10/1989 | Knapp | F01D 25/164 384/535 |
| 5,222,815 A | | 6/1993 | Ide | |
| 5,328,408 A | * | 7/1994 | Wolf | F16F 15/1442 464/180 |
| 5,421,655 A | | 6/1995 | Ide et al. | |
| 5,603,574 A | | 2/1997 | Ide et al. | |
| 5,743,654 A | | 4/1998 | Ide et al. | |
| 6,700,747 B2 | | 3/2004 | Matz | |
| 8,083,413 B2 | | 12/2011 | Ertas | |
| 8,206,039 B2 | * | 6/2012 | Maier | F16C 17/02 384/535 |
| 2013/0216174 A1 | | 8/2013 | Braun | |

* cited by examiner

*Primary Examiner* — Phillip A Johnson
(74) *Attorney, Agent, or Firm* — Robert M. McCarthy (57) ABSTRACT

Embodiments of a bearing having integrally formed parts are provided herein. In some embodiments, a damper assembly of a gas bearing may include a housing having a fluid filled cavity formed therein; a compliant seal disposed within an opening of the cavity to seal the cavity; a damper plunger disposed within the cavity, wherein the damper plunger is movable within the cavity; and a bearing pad disposed outside of the cavity and coupled to the damper plunger, wherein the damper plunger and bearing pad are integrally formed with one another.

20 Claims, 7 Drawing Sheets

BEARING HAVING INTEGRALLY FORMED COMPONENTS

BACKGROUND

The field of the disclosure relates generally to gas bearing assemblies, and more particularly, to gas bearings having integrally formed components.

Conventional turbomachines possess rotor assemblies that include shafts, compressor impellers, turbines, couplings, sealing packs and other elements required for optimal operation under given operating conditions. These rotor assemblies have a mass generating a constant static force due to gravity, and also generate a dynamic force due to imbalances in the rotor assembly during operation. Other static forces can be generated from geared turbomachinery. Such turbomachines include bearings to sustain and support these forces while permitting rotation of the rotor assembly.

At least some known rotary machines use gas bearings where a non-oil lubricated bearing is desired. However, the inventors have observed that some gas bearings, particularly gas bearings that have been adapted for use in full-scale turbomachinery, typically require a substantial number of assembled components to provide the necessary functionality to meet dynamic loading requirements. Such a high number of components introduce high complexity, cost, and weight to the gas bearing, thereby limiting potential applications especially in aerospace turbomachinery where weight reduction is paramount. Moreover, the high number of components increases a size of the gas bearing without providing additional functionality, thereby preventing the gas bearing form being utilized within space limited locations throughout the turbomachinery such as aircraft engines.

Therefore, the inventors have provided an improved gas bearing having integrally formed components.

BRIEF DESCRIPTION

Embodiments of a bearing having integrally formed parts are provided herein.

In some embodiments, a damper assembly of a gas bearing may include a housing having a fluid filled cavity formed therein; a compliant seal disposed within an opening of the cavity to seal the cavity; a damper plunger disposed within the cavity, wherein the damper plunger is movable within the cavity; and a bearing pad disposed outside of the cavity and coupled to the damper plunger, wherein the damper plunger and bearing pad are integrally formed with one another.

In some embodiments, a bearing may include an outer rim; a housing; a damper assembly, comprising: a fluid filled cavity formed within the housing; a compliant seal disposed within an opening of the cavity to seal the cavity; a damper plunger disposed within the cavity, wherein the damper plunger is movable within the cavity; a bearing pad defining an annular inner surface of the bearing and disposed outside of the cavity and coupled to the damper plunger; a spring coupling the bearing pad to the housing; and a shaft coupling the bearing pad to the damper plunger, wherein the outer rim, housing, compliant seal, damper plunger, bearing pad, spring and shaft are integrally formed with one another.

The foregoing and other features of embodiments of the present invention will be further understood with reference to the drawings and detailed description.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

Embodiments of a bearing having integrated components are provided herein. In at least some embodiments, the inventive bearing provides a high performance fluid damper with a hydrostatically pressurized compliant bearing pad. Moreover, the inventive bearing advantageously includes one or more integrated parts, thereby reducing a total number of parts that would otherwise be utilized in conventional gas bearing construction, thus reducing weight, complexity, cost and overall size of the bearing as compared to conventional gas bearings. Such a reduction in size and weight allows the bearing to be utilized in full scale aerospace turbomachinery having limiting weight and/or space requirements (e.g., aircraft engines). Moreover, the reduction in size and weight further allows the bearing to be utilized in unconventional locations and/or integrations throughout a turbomachine without disrupting an existing cross section, length or architecture of the turbomachine.

Figure 1:
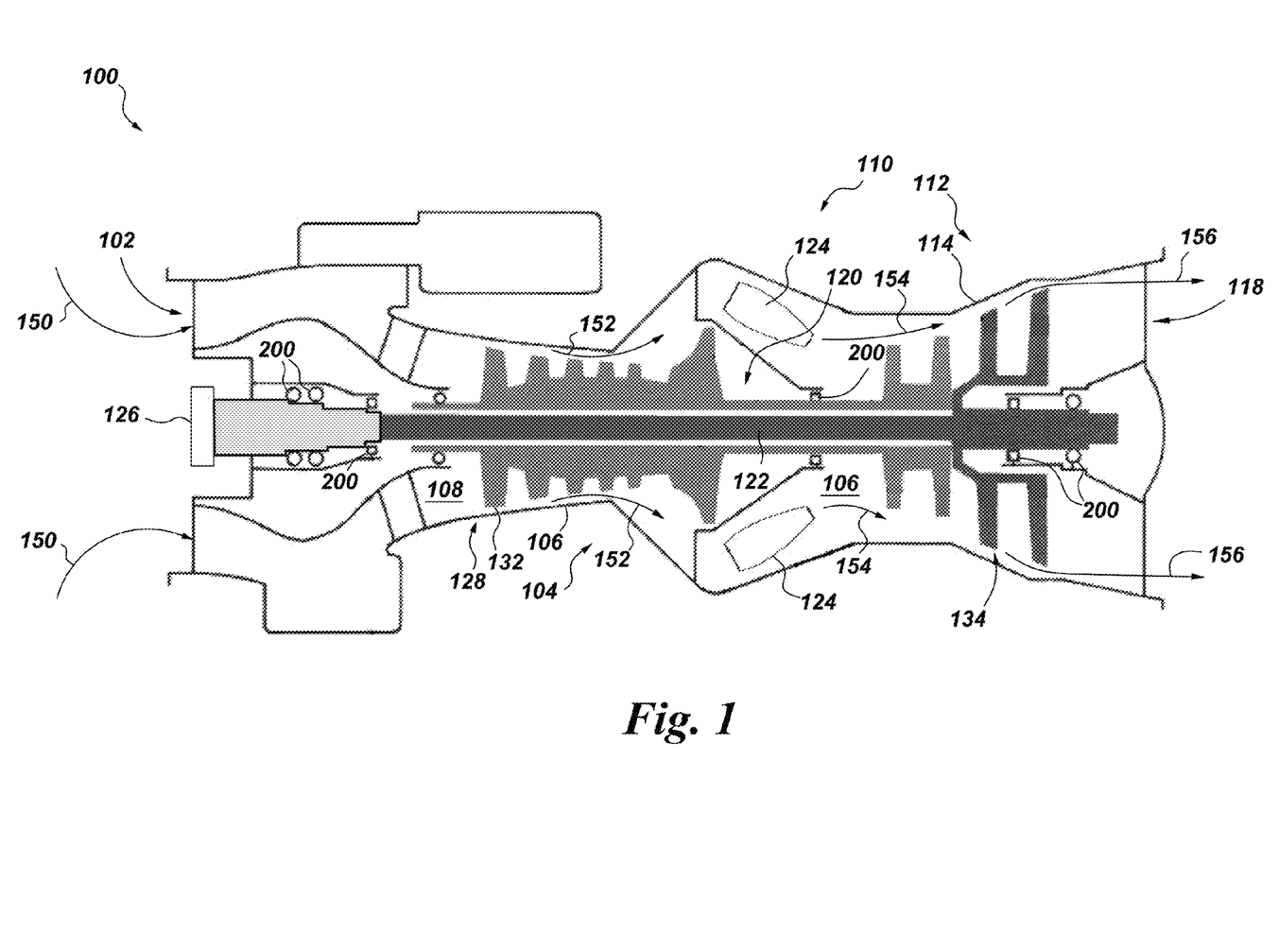
FIG. 1 is a schematic view of a rotary machine.

FIG. 1 is a schematic view of a rotary machine, i.e., a turbomachine 100, and more specifically, a non-oil lubricated turbine engine. In the exemplary embodiment, the turbine engine is a gas turbine engine. Alternatively, turbomachine 100 is any other turbine engine and/or turbomachine, including, without limitation, a steam turbine engine, a centrifugal compressor, and a turbocharger. In the exemplary embodiment, turbomachine 100 includes an air intake section 102, and a compressor section 104 that is coupled downstream from, and in flow communication with, intake section 102. Compressor section 104 is enclosed within a compressor casing 106 defining a compressor chamber 108. A combustor section 110 is coupled downstream from, and in flow communication with, compressor section 104, and a turbine section 112 is coupled downstream from, and in flow communication with, combustor section 110. Turbine section 112 is enclosed within a turbine casing 114 defining a turbine chamber 116. An exhaust section 118 is provided downstream from turbine section 112. Moreover, in the exemplary embodiment, turbine section 112 is coupled to compressor section 104 via a rotor assembly 120 including a drive shaft 122. Drive shaft 122 is rotationally supported by one or more bearing assemblies, for example, gas bearing or journal bearing assemblies (shown at multiple positions in accordance with one or more embodiments at 200) located within compressor casing 106 and turbine casing 114.

In the exemplary embodiment, combustor section 110 includes a plurality of combustor assemblies, i.e., combustors 124 that are each coupled in flow communication with compressor section 104. Moreover, in the exemplary embodiment, turbine section 112 and compressor section 104 are rotatably coupled to a load 126 via drive shaft 122. For example, load 126 may include, without limitation, an electrical generator and/or a mechanical drive application, e.g., a pump, a propeller, fan, rotor, or the like. In some embodiments, the turbomachine 100 may be an aircraft engine.

Also, in the exemplary embodiment, compressor section 104 includes at least one compressor blade assembly 128 and at least one optional adjacent stationary vane assembly (not shown). Each combination of compressor blade assembly 128 and adjacent stationary vane assembly defines a compressor stage. Also, each compressor blade assembly 128 includes a plurality of compressor blades 132 and each stationary vane assembly includes a plurality of compressor vanes. Furthermore, each compressor blade assembly 128 is removably coupled to drive shaft 122 and each stationary vane assembly is removably coupled to, and supported by, compressor casing 106.

Further, in the exemplary embodiment, turbine section 112 includes at least one turbine blade assembly 134 and at least one adjacent stationary nozzle assembly (not shown). Each combination of turbine blade assembly 134 and adjacent stationary nozzle assembly defines a turbine stage. Also, each turbine blade assembly 134 is removably coupled to drive shaft 122 and each stationary nozzle assembly is removably coupled to, and supported by, turbine casing 114.

In operation, air intake section 102 channels air 150 towards compressor section 104. Compressor section 104 compresses inlet air 150 to higher pressures and temperatures prior to discharging compressed air 152 towards combustor section 110. Compressed air 152 is channeled to a fuel nozzle assembly (not shown), mixed with fuel (not shown), and burned within each combustor 124 to generate combustion gases 154 that are channeled downstream towards turbine section 112. Combustion gases 154 generated within combustors 124 are channeled downstream towards turbine section 112. After impinging turbine blade assembly 134, thermal energy is converted to mechanical rotational energy that is used to drive rotor assembly 120. Turbine section 112 drives compressor section 104 and/or load 126 via drive shaft 122, and exhaust gases 156 are discharged through exhaust section 118 to ambient atmosphere. Bearing assemblies 200 facilitate rotation of rotor assembly 120 and dampen vibrational energy imparted to bearing assemblies 200 during operation of turbomachine 100. Although bearing assemblies 200 are described and illustrated as being located within compressor casing 106 and turbine casing 114, bearing assemblies 200 may be located at any desired location along shaft 122 including, but not limited to, a central or mid-span region of shaft 122, or other locations along shaft 122 where the use of conventional bearing assemblies would present significant design challenges. Further, bearing assemblies 200 may be used in combination with conventional oil-lubricated bearing assemblies. For example, in one embodiment, conventional oil-lubricated bearing assemblies may be located at the ends of shaft 122, and one or more bearing assemblies 200 may be located along a central or mid-span region of shaft 122.

Figure 2A:
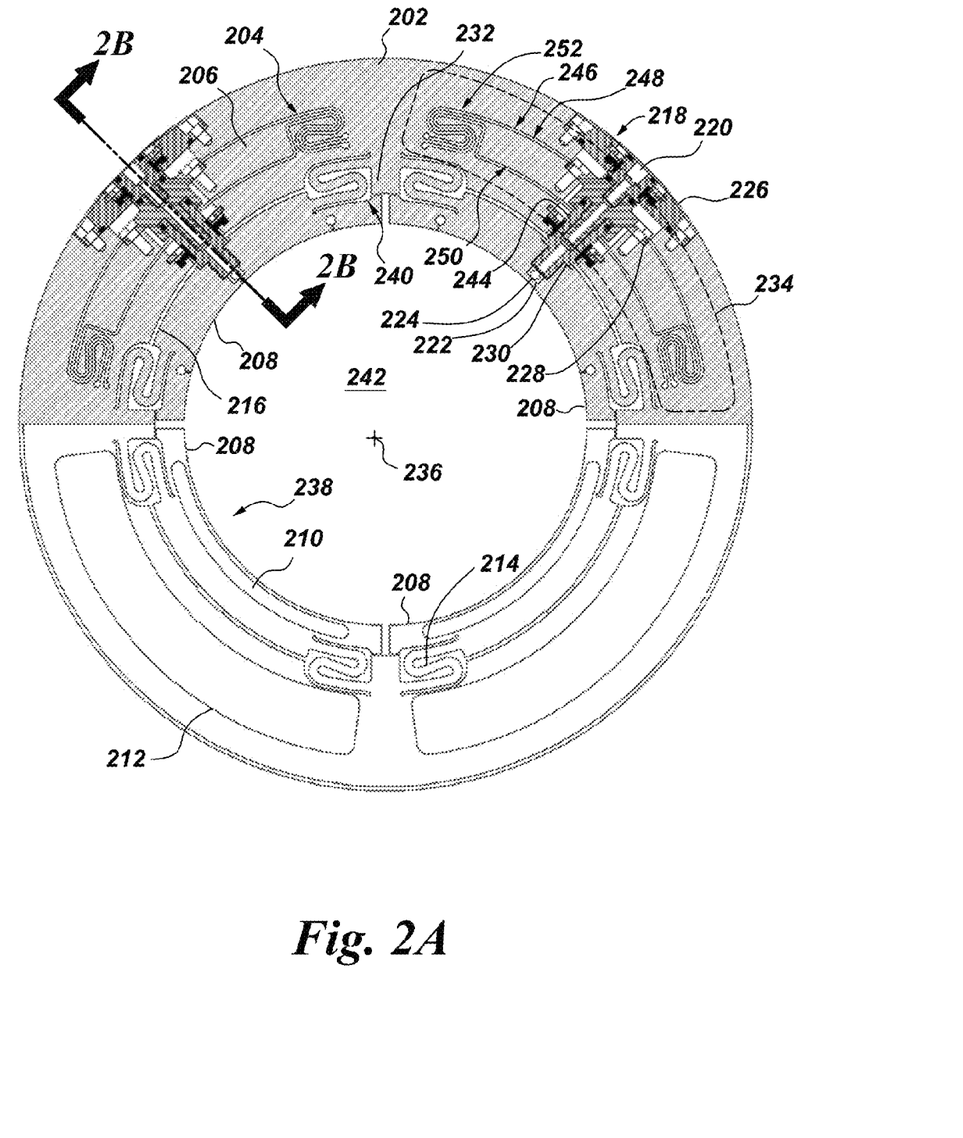
FIG. 2A is an axial and partial cross-sectional view of an exemplary gas bearing in accordance with some embodiments of the present invention.

Referring to FIG. 2A, in some embodiments, the bearing 200 may generally comprise an outer rim 202, housing 216, a plurality of bearing pads 208 and a plurality of damper assemblies (indicated generally at 234 of FIG. 2A).

The bearing pads 208 are symmetrically arranged about a central axis 236 of the bearing assembly 200 and define an annular inner surface 238 that is configured to support a rotatable shaft (e.g. shaft 122 of FIG. 1). In some embodiments, each bearing pad 208 is adapted to receive a working gas (e.g., air, compressed air and combustion gases, or the like) from a gas inlet 220, and disperse and/or diffuse the gas to support and/or lubricate the shaft during operation of the turbomachine, thereby providing a hydrostatically pressurized compliant bearing pad 208. For example, in some embodiments, each bearing pad 208 has a sufficiently high gas permeability to permit the gas received via the gas inlet 220 to generate sufficient pressure within interior cavity 242 to provide the support and/or lubrication of the shaft 122. Alternatively, or in combination, in some embodiments, the bearing pad 208 may include a plurality of gas distribution holes 224 disposed across the bearing pad 208 to provide an evenly distributed pressure field within an interior cavity 242 for supporting and/or lubricating the shaft. In such embodiments, the plurality of gas distribution holes 224 may be fluidly coupled to one or more plenums 222 to facilitate even distribution of the gas. In embodiments where the one or more plenums 222 are present, a bearing pad sealing plate 210 may be coupled to the bearing pad 208 to seal the one or more plenums 222.

The plurality of gas distribution holes 224 may be configured having any dimensions or arrangements (e.g., array, pattern or configuration) suitable to function as described herein. For example, in some embodiments, the plurality of gas distribution holes 224 may generally have a diameter in the range of between about 2 mils (about 50 micrometers) and about 100 mils (about 2,540 micrometers) and, more specifically, between about 5 mils (about 127 micrometers) and about 20 mils (about 508 micrometers).

The bearing pads 208 may be fabricated from any material suitable to withstand the working conditions of the bearing 200. In addition, in some embodiments, the bearing pad 208 is fabricated form a material having a sufficiently low porosity to prevent instabilities in the thin gas film created between bearing pads 208 and shaft during operation of the turbomachine. For example, in some embodiments, the bearing pads 208 may be fabricated from porous carbons, such as carbon graphite, sintered porous ceramics, and sintered porous metals, such as Inconel® and stainless steel.

The inventors have observed that conventional gas bearings typically include a bearing pad assembly to facilitate coupling the bearing pad to the gas bearing housing. However, such assemblies are typically constructed from a plurality of separate components that require assembly, thereby adding weight to the gas bearing and making the gas bearing complex and costly. As such, in some embodiments, the bearing pads 208 may be coupled to the housing 216 via a plurality of bearing pad springs (springs) 214. When present, the springs 214 facilitate coupling of the bearing pads 208 to the housing 216 while providing movement of bearing pads 208 in a radially inward or outward direction (in relation to the central axis 236) and/or a transfer of energy between the bearing pad 208 and a damper plunger 206 of the damper assemblies 234. In some embodiments, one or more mechanical stops 232 may be disposed proximate a back surface 240 of the bearing pads 208 to limit a range of motion of the bearing pad 208.

In some embodiments, each of the bearing pad springs 214 may be integrally formed with at least one of the bearing pads 208 and the housing 216. For example, in some embodiments, the bearing pads 208, bearing pad springs 214 and the housing 216 may be fabricated to form a single integral part, such as shown in FIG. 2A. In addition, in some embodiments, the housing 216 and outer rim 202 may similarly be fabricated to form a single integral part (e.g., such as shown in the figures). The inventors have observed that providing the separate components (e.g., bearing pads 208, bearing pad springs 214, housing 216, outer rim 202) as a single integral part reduces a total number of parts that would otherwise be utilized in conventional gas bearing construction, thereby reducing weight, complexity, cost and overall size of the bearing as compared to conventional gas bearings.

The bearing pads 208, bearing pad springs 214 and the housing 216 may be fabricated via any technique suitable to facilitate forming the integral part. For example, in some embodiments, the bearing pads 208, bearing pad springs 214 and the housing 216 may be fabricated using an electric discharge machining (EDM) process or additive manufacturing process (also known as rapid prototyping, rapid manufacturing, and 3D printing) such as selective laser sintering (SLS), direct metal laser sintering (DMLS), electron beam melting (EBM), diffusion bonding, or selective heat sintering (SHS).

Figure 2B:
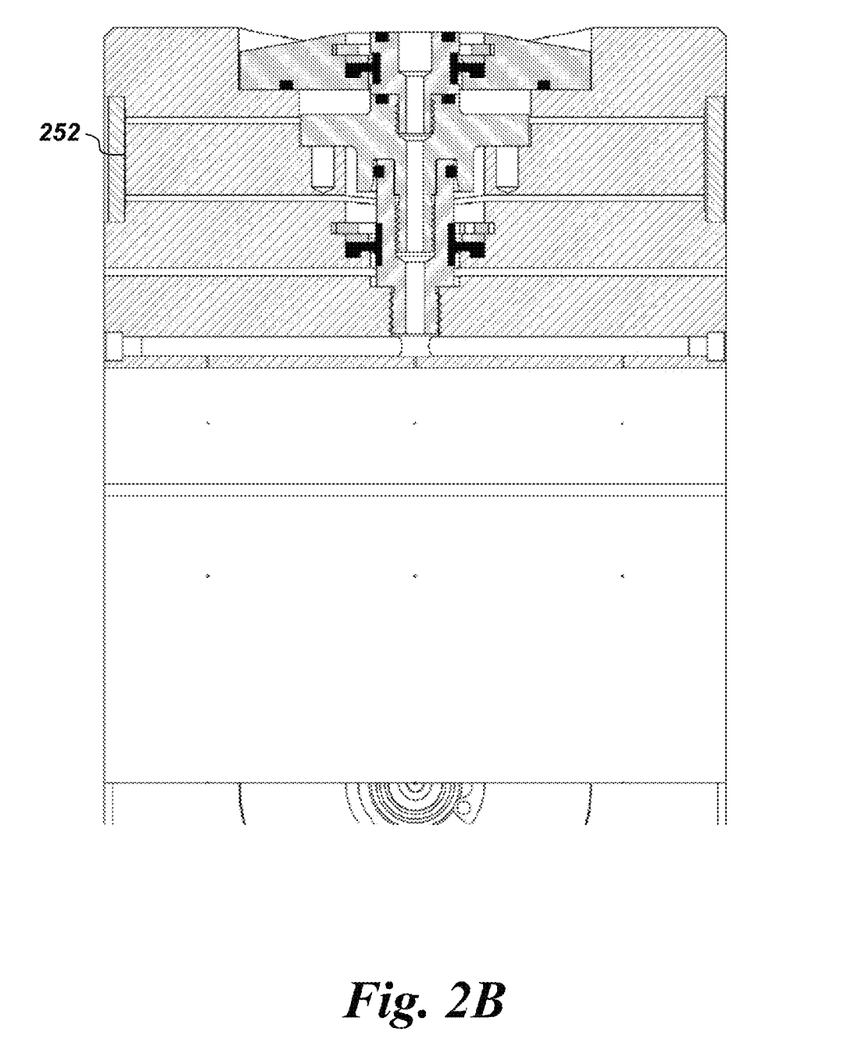
FIG. 2B is a cross-sectional view of the exemplary gas bearing along the line 2B-2B of FIG. 2A in accordance with some embodiments of the present invention.

The damper assemblies 234 generally comprise a damper plunger 206, damper spring 204, and a coupling assembly 218. The damper plunger 206 is disposed within a cavity 246 formed within the housing 216 and coupled to the housing 216 via the damper spring 204. The damper spring 204 supports the damper plunger 206 and separates the cavity 246 into a first control volume 248 and second control volume 250, forming a resistive path 252 (shown in FIGS. 2A and 2B) between the first control volume 248 and second control volume 250. The unoccupied portion of the cavity 246 is filled with a non-compressible, viscous fluid and is hermetically sealed via a sealing plate 212. The fluid may be any non-compressible, viscous fluid suitable for the particular operating environment. For example, in some embodiments, the fluid may be an oil-based fluid, a liquid metal (broadly, a metallic fluid), or the like.

The coupling assembly 218 generally includes a plurality of seals (three seals 226, 228, 230 shown), a plunger 244, and the gas inlet 220. The plunger 244 is configured to transmit loads imparted on a bearing pad 208 to the damper assembly 234. For example, in operation, when plunger 244 is loaded and unloaded (via a force applied to the bearing pad 208), the fluid is forced through resistive flow path 252 thereby converting vibrational energy imparted on damper assembly 234 into heat, which is subsequently dissipated through conduction and/or convention.

In some embodiments, the damping plunger 206 and damper spring 204 may be a single integrally formed part. In addition, in such embodiments, the damping plunger 206 and damper spring 204 may be further integrally formed with the housing 216, such as shown in FIG. 2A. Any suitable fabrication technique may be utilized to create such integrally formed parts, for example such as the EDM or additive manufacturing techniques described above. As discussed above, the inventors have observed that providing the separate components (e.g., damping plunger 206, damper spring 204, housing 216) as a single integral part reduces a total number of parts that would otherwise be utilized in conventional gas bearing construction, thereby reducing weight, complexity, cost and overall size of the bearing as compared to conventional gas bearings.

Figure 3:
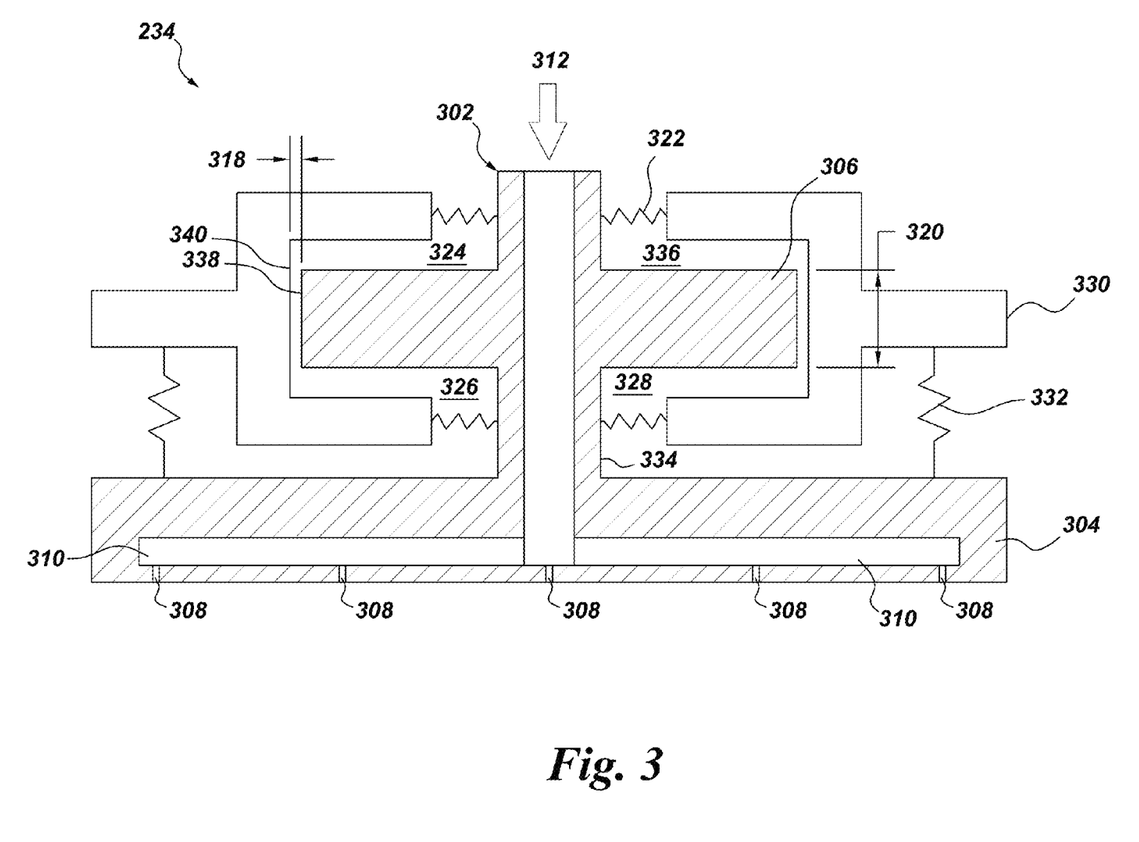
FIG. 3 is a schematic view of a damper assembly suitable for use with a gas bearing in accordance with some embodiments of the present invention.

Although shown as a multicomponent part in FIG. 2A, in some embodiments, the coupling assembly 218 may be replaced by a single part that is integrally formed with the bearing pad 208. For example, FIG. 3 depicts the damper plunger 306 and damper pad 304 as a single integrally formed component (collectively "integral damping pad 302"). Providing the damper plunger 306 and damper pad 304 as a single integrally formed component facilitates a further reduction in parts of the bearing 200, thereby further reducing the cost, complexity, size and weight of the bearing 200. Any suitable fabrication technique may be utilized to create such integrally formed parts, for example such as the EDM or additive manufacturing techniques described above.

Referring to FIG. 3, in some embodiments, the plunger 306 and damper pad 304 may be coupled to one another via a shaft 334, which is also an integral part of the integral damping pad 302. In some embodiments, one or more springs 332 may support the bearing pad 304, and further, may couple the bearing pad to a housing 330 (e.g., housing 216 of bearing 200 described above) and control a radial stiffness of the bearing.

In some embodiments, the shaft 334 extends beyond the damper plunger 306 and includes a through hole 314 formed therein to facilitate coupling a gas inlet 312 to a plenum 310 and gas distribution holes 308 of the bearing pad 304. When present, the gas inlet 312, plenum 310 and gas distribution holes 308 provide the same or similar functionally and may be configured the same or similar to the gas inlet 220, plenum 222 and gas distribution holes 224 described above.

The damper plunger 306 is disposed within a cavity 336 formed in the housing 330 and separates the cavity 336 into a first control volume 324 and a second control volume 326. The damper plunger 306 and cavity 336 is dimensioned relative to one another to provide a predetermined clearance 318 between an end 338 of the damper plunger 306 and the cavity wall 340 to form a resistive flow path 320 between the first control volume 324 and the second control volume 326. The unoccupied portion of the cavity 336 is filled with a non-compressible, viscous fluid 328 and is hermetically sealed via a compliant seal 322. It is to be noted, that in some embodiments, a stiffness of the compliant seal 322 and springs 332 may each be adjusted in relation to one another to control an overall stiffness of the bearing 200. For example, in some embodiments, the compliant seal 322 may be significantly less stiff than the springs 332 to allow a designer to control the bearing support stiffness predominately through the springs 332.

In operation, when a force (e.g., a vibrational force caused by rotation of a shaft) is applied to the bearing pad 304, a relative motion between the damper plunger 306 and the housing 330 occurs. Such a motion causes the fluid 328 to be forced through resistive flow path 320 between the first control volume 324 and the second control volume 326 of the cavity 336. Due to a dash-pot effect of the fluid 328 (resistance to motion via viscous friction) an energy of the force is dissipated, thereby damping the force.

Figure 4:
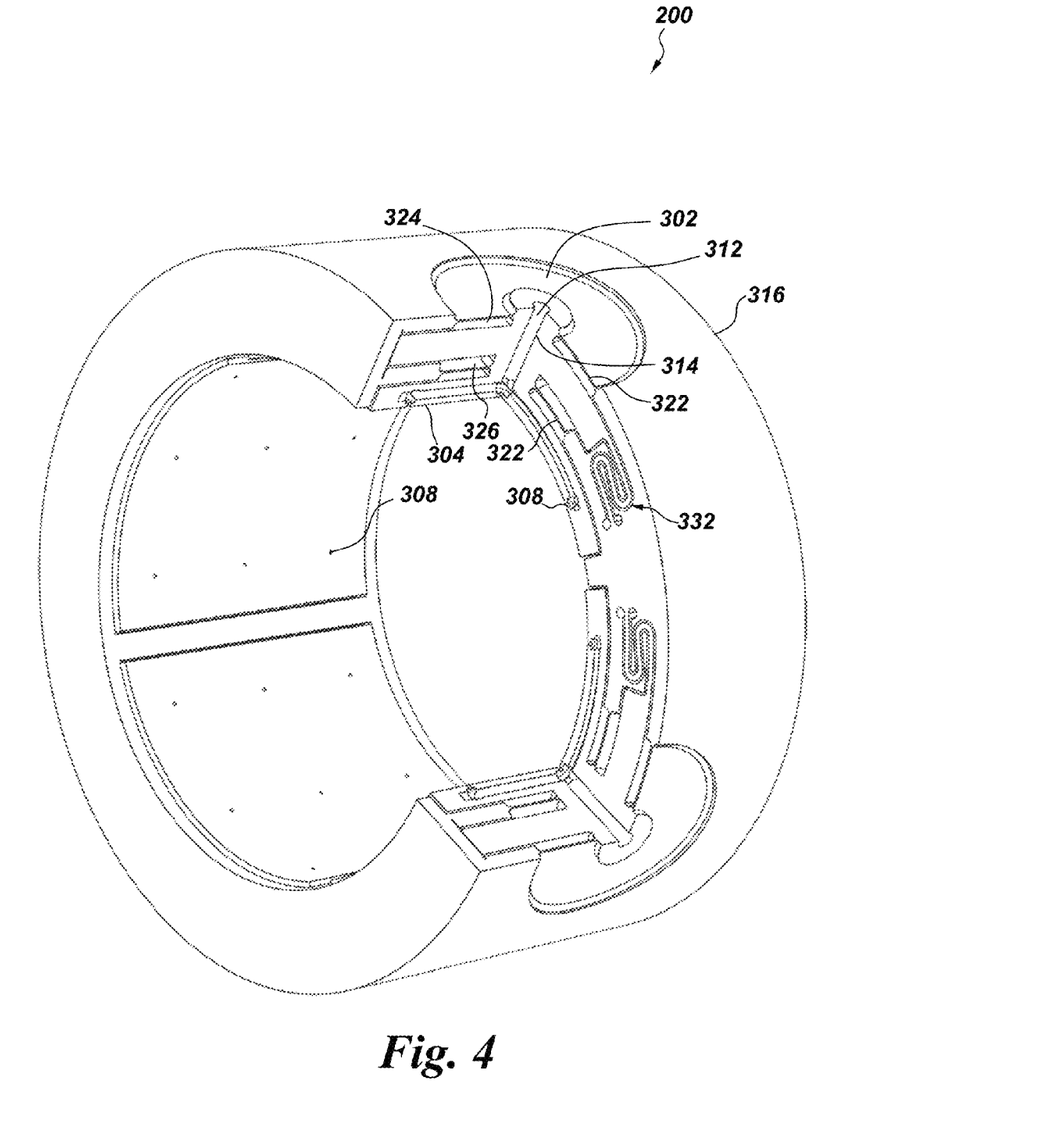
FIG. 4 is a partial cross-sectional view of an exemplary gas bearing in accordance with some embodiments of the present invention.

While described above as separate components, the compliant seal 322, housing 330, springs 332 and integral damping pad 302 may all be integrally formed to provide a single component, thereby further reducing the cost, complexity, size and weight of the bearing 200. Any suitable fabrication technique may be utilized to create such integrally formed parts, for example such as the EDM or additive manufacturing techniques described above. For example, an exemplary implementation of the integral damper pad 302 in a bearing 200 is shown in FIG. 4. In such embodiments, and as shown in the figure, the entire bearing 200 may be fabricated as a single part. The inventors have observed that fabricating the bearing 200 as a single part significantly reduces a weight and size of a conventionally assembled multicomponent bearing. Such a reduction in weight and size allows the bearing to be used in weight and space limited applications (e.g., aircraft engines) that would otherwise exclude the use of conventionally assembled multicomponent bearings.

Figure 5:
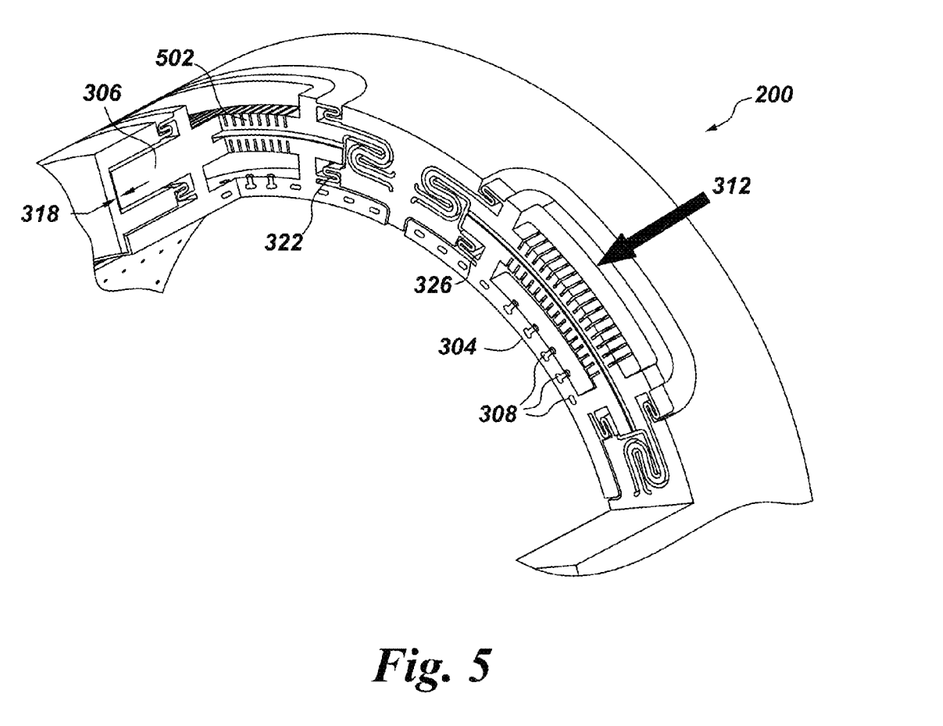
FIG. 5 is a partial cross-sectional view of an exemplary gas bearing in accordance with some embodiments of the present invention.

FIG. 5 depicts another exemplary implementation of the integrally fabricated bearing 200. As depicted in FIG. 5, in some embodiments, the damper plunger 306 may include a plurality of cooling fins (heat exchanger 502). In such an embodiment, pressurized air provided by the gas inlet 312 passes through the heat exchanger 502 prior to progressing through the bearing pad 304 to support and/or lubricate the shaft during operation of the turbomachine.

The inventors have observed that the above described reduction in size and weight of the inventive bearing 200 may further allow the bearing 200 to be utilized in unconventional locations and/or integrations throughout a turbomachine without disrupting an existing cross section, length or architecture of the turbomachine. Such utilization of the inventive bearing 200 may advantageously benefit engine operation due to reduced clearance closures during maneuver of loads, ability to engineer loner rotor bearing systems with additional stages, reduction in dynamic bearing and structural loads, reduction in synchronous vibration response, and improved stability.

Figure 6:
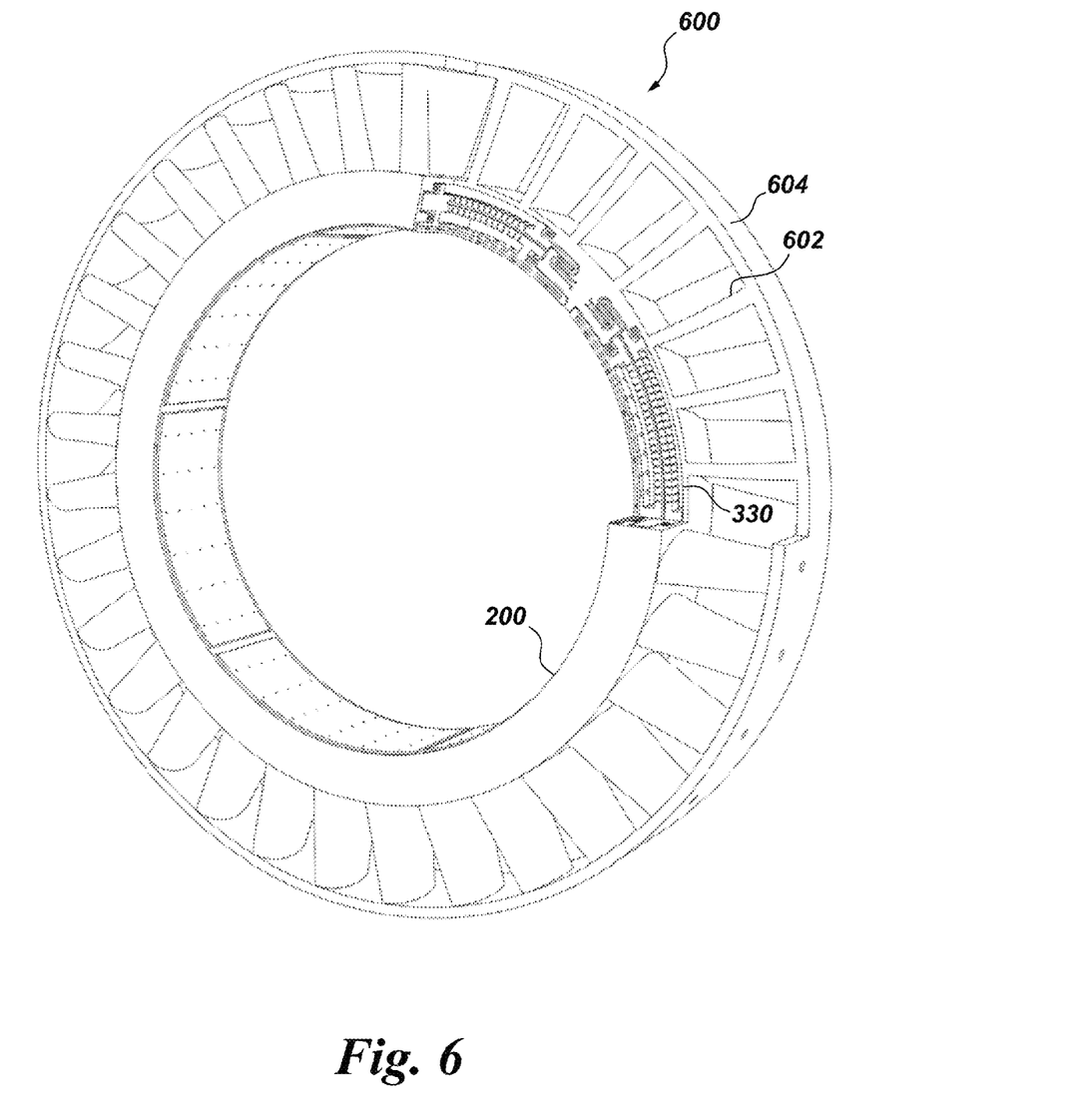
FIG. 6 is a partial cross-sectional view of an exemplary gas bearing in accordance with some embodiments of the present invention.

For example, in some embodiments, the bearing 200 may be integrated into a turbine nozzle 600 of an aircraft engine, such as shown in FIG. 6. In such embodiments, guide vanes 602 of the nozzle 600 may be disposed between, and supported by, the housing 330 of the bearing 200 and an outer ring 604 of the turbine nozzle 600.

Thus, embodiments of a bearing having integrally formed components have been provided herein. In at least some embodiments, the inventive bearing advantageously includes one or more integrated parts, thereby reducing a total number of parts that would otherwise be utilized in conventional gas bearing construction, thus reducing weight, complexity, cost and overall size of the bearing as compared to conventional gas bearings.

Ranges disclosed herein are inclusive and combinable (e.g., ranges of "about 2 mils and about 100 mils", is inclusive of the endpoints and all intermediate values of the ranges of "about 2 mils and about 100 mils," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "some embodiments", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A damper assembly of a gas bearing, comprising:
a housing having a fluid filled cavity formed therein;
a compliant seal disposed within an opening of the cavity to seal the cavity;
a damper plunger disposed within the cavity, wherein the damper plunger is movable within the cavity; and
a bearing pad disposed outside of the cavity and coupled to the damper plunger, wherein the damper plunger and bearing pad are integrally formed with one another.

2. The damper assembly of claim 1, further comprising a spring movably coupling the bearing pad to the housing.

3. The damper assembly of claim 2, wherein the spring, bearing pad, and housing are integrally formed with one another.

4. The damper assembly of claim 1, further comprising a shaft coupling the bearing pad to the damper plunger, wherein the damper plunger, shaft and bearing pad are integrally formed with one another.

5. The damper assembly of claim 4, wherein the shaft comprises a through hole fluidly coupling a gas inlet to a plenum formed in the bearing pad.

6. The damper assembly of claim 5, wherein the bearing pad comprises a plurality of fluid distribution holes fluidly coupled to the plenum.

7. The damper assembly of claim 1, wherein the damper plunger and cavity have relative dimensions such that an end of the damper plunger and a wall of the cavity provide a resistive flow path of the fluid between a first control volume and second control volume of the cavity.

8. The damper assembly of claim 1, further comprising a spring coupling the damper plunger to the housing.

9. The damper assembly of claim 8, wherein the spring, damper plunger, and housing are integrally formed with one another.

10. The damper assembly of claim 1, wherein the damper plunger comprises a plurality of cooling fins.

11. The damper assembly of claim 1, wherein the housing and compliant seal are integrally formed with one another.

12. A bearing, comprising:
an outer rim;
a housing;
a damper assembly, comprising:
a fluid filled cavity formed within the housing;
a compliant seal disposed within an opening of the cavity to seal the cavity;
a damper plunger disposed within the cavity, wherein the damper plunger is movable within the cavity;
a bearing pad defining an annular inner surface of the bearing and disposed outside of the cavity and coupled to the damper plunger;

a spring coupling the bearing pad to the housing; and a shaft coupling the bearing pad to the damper plunger, wherein the outer rim, housing, compliant seal, damper plunger, bearing pad, spring and shaft are integrally formed with one another.

13. The bearing of claim 12, wherein the damper plunger comprises a plurality of cooling fins.

14. The bearing of claim 12, wherein the shaft comprises a through hole fluidly coupling a gas inlet to a plenum formed in the bearing pad.

15. The bearing of claim 12, wherein the bearing pad comprises a plurality of fluid distribution holes fluidly coupled to the plenum.

16. The bearing of claim 12, wherein the damper plunger and cavity have relative dimensions such that an end of the damper plunger and a wall of the cavity provide a resistive flow path of the fluid between a first control volume and second control volume of the cavity.

17. A bearing, comprising:

an outer rim;

a housing;

a damper assembly, comprising:
   a fluid filled cavity formed within the housing;
   a damper plunger disposed within the cavity, wherein the damper plunger is movable within the cavity;
   a first spring coupling the damper plunger to the housing;

a bearing pad defining an annular inner surface of the bearing and disposed outside of the cavity;

a plunger coupling the bearing pad to the damper plunger; and a second spring coupling the bearing pad to the housing, wherein the outer rim, housing, damper plunger, bearing pad, first spring and second spring are integrally formed with one another.

18. The bearing of claim 17, wherein the damper plunger comprises a plurality of cooling fins.

19. The bearing of claim 17, wherein the plunger comprises a through hole fluidly coupling a gas inlet to a plenum formed in the bearing pad.

20. The bearing of claim 17, wherein the bearing pad comprises a plurality of fluid distribution holes fluidly coupled to the plenum.

\* \* \* \* \*